May 8, 1934. W. D. SCHMIDT 1,958,021
FIXTURE
Filed Dec. 4, 1931 2 Sheets-Sheet 1
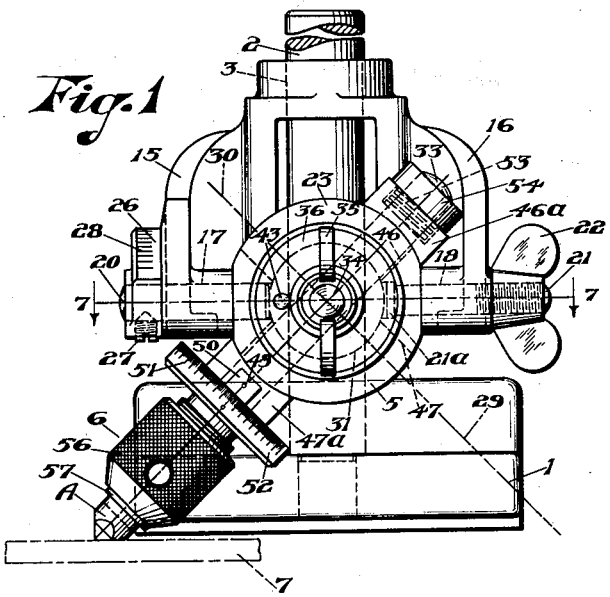
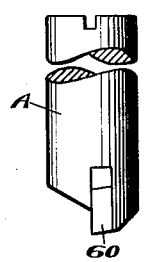
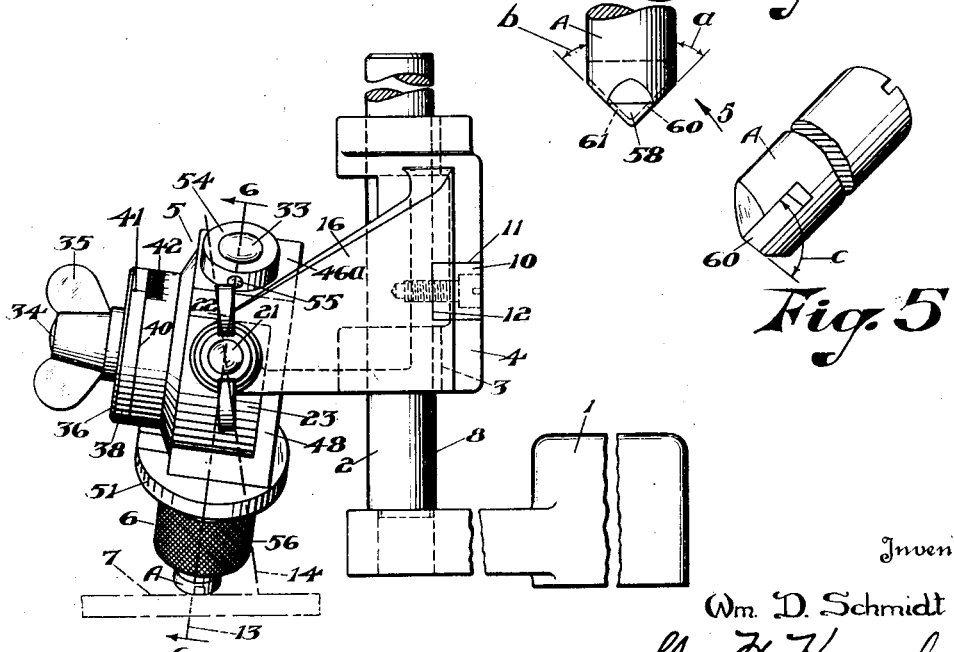
Inventor
Wm. D. Schmidt
By Geo. H. Kennedy Jr.
Attorney May 8, 1934.  W. D. SCHMIDT  1,958,021
FIXTURE
Filed Dec. 4, 1931    2 Sheets-Sheet 2
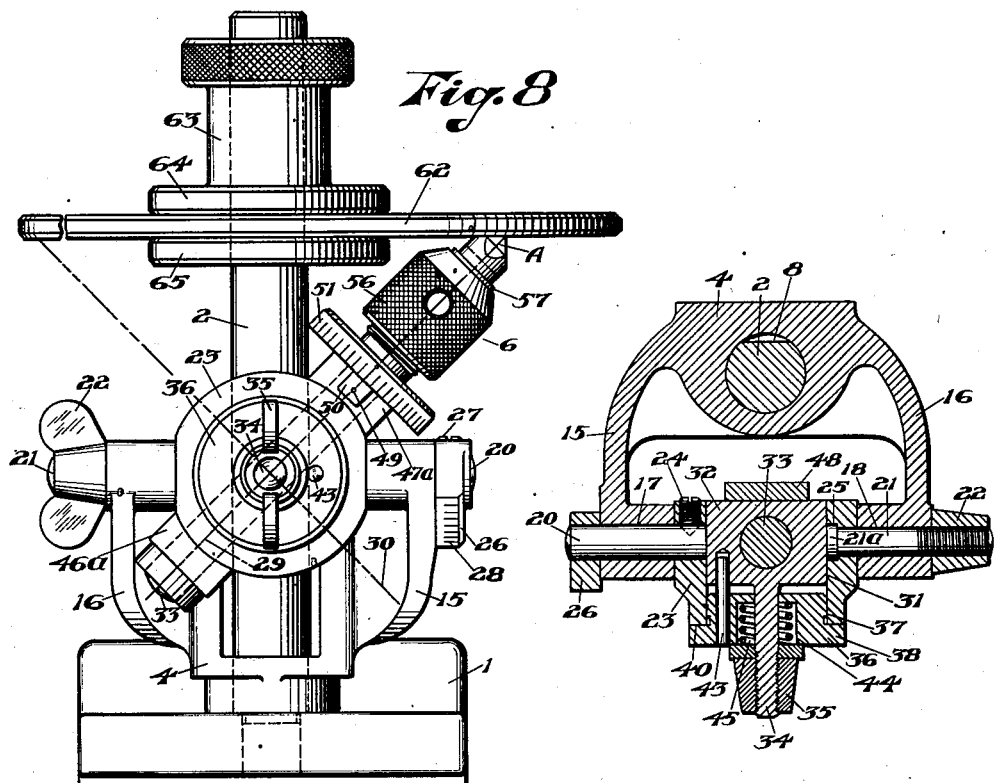
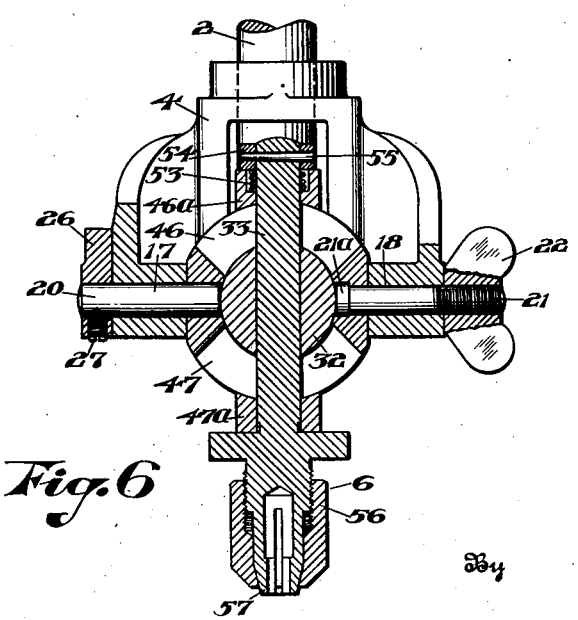
Inventor
Wm. D. Schmidt
By Geo. H. Kennedy Jr.
Attorney

Patented May 8, 1934

1,958,021

UNITED STATES PATENT OFFICE

1,958,021

FIXTURE

William D. Schmidt, Worcester, Mass., assignor to The Heald Machine Company, Worcester, Mass., a corporation of Massachusetts Application December 4, 1931, Serial No. 578,872

9 Claims. (Cl. 51—220)

The present invention relates to fixtures for supporting cutting tools during the sharpening thereof and is particularly directed to a universally adjusted fixture by which several surfaces in predetermined angular relation to each other may be ground without the necessity for removal of the tool from the fixture.

In the production of finished surfaces on workpieces with the use of cutting tools, the angularity of the several surfaces forming the cutting portion of the tool varies in accordance with the speed of cutting the material to be cut the depth of cut and certain other variables. After having determined the desirable and proper angular relation of the tool surfaces, it is essential, for proper cutting action, to be able to reproduce the same surfaces, either in resharpening the same tool or in sharpening a new tool in readiness for a cutting operation.

According to the invention, a fixture carries a clamping element in which the cutting tool may be mounted and said clamping member is universally adjustable relative to the supporting structure to permit the tool to be placed in predetermined angular positions for grinding the surfaces of the tool in proper angular relation to each other, the various adjustments being indicated on the fixture.

When a tool has become dull from use, the resharpening is effected by grinding away or removing each surface of the cutting tool to provide a new cutting surface in exact parallel relation to the original cutting surface. Since it is impossible properly to locate a cutting tool in the desired angular relation in the supporting fixture, the present invention involves a method by which the cutting tool may be located in the fixture at the desired cutting angle, thereby to permit a grinding or sharpening operation to be performed on the cutting tool at precisely the desired angle.

In accordance with this feature of the invention, a transparent member provides a surface exactly parallel to the surface of the sharpening tool, which may be, for example, a lap or a grinding wheel and the surface of the cutting tool which is to be ground is brought into contact with the surface of the transparent member as may readily be determined by the person who is adjusting the tool by looking through said transparent member until the entire surface to be ground is in contact with the surface of the transparent member. The cutting tool will then be in proper relation to the sharpening surface to permit the sharpening operation to take place.

Further advantages will be apparent from the following description taken in connection with the accompanying drawings in which:—

Fig. 1 is a front elevation view of the fixture embodying the invention, showing the cutting tool in adjusted position.

Fig. 2 is a side elevation view of the fixture shown in Fig. 1.

Fig. 3 is a plan view of a cutting tool for which the fixture is especially adapted.

Fig. 4 is a side elevation view of the cutting tool of Fig. 5.

Fig. 5 is an elevation view looking substantially in the direction of the arrow 5 of Fig. 3.

Fig. 6 is a section on the line 6—6 of Fig. 2.

Fig. 7 is a section along the line 7—7 of Fig. 1.

Fig. 8 is a side elevation view of the fixture showing the parts thereof in a position for locating the cutting tool in proper relation to the fixture in preparation for a sharpening operation thereon.

Like reference characters refer to like parts in the different figures.

Referring to the drawings, particularly to Figs. 1 and 2, a heavy base 1 has a vertically extending spindle 2 which extends through a vertical bore 3 in a supporting member 4. The supporting member 4 is one element of the universally adjustable fixture 5 which also provides a chuck 6 in which a cutting tool A is mounted. The chuck 6 may be adjusted universally relative to the supporting member 4 and accordingly supports the cutting tool A in any desired position, such that the desired surfaces of the cutting tool may be presented to the horizontal rotary grinding surface or lap 7.

The supporting member is slidable on the spindle 2 and is held against rotation on said spindle to maintain the cutting tool in proper position relative to the grinding surface. As best shown in Figs. 2 and 7, the spindle 2 is formed with a flat surface 8, and a block 10, mounted in a recess 11 in the supporting member 4, provides a flat surface 12 within the bore 3 of said member, said surface 12 cooperating with the surface 8 to hold the member 4 against rotation. In this manner, the cutting tool is held against the grinding surface with a constant pressure, as determined by the weight of the fixture 5, the latter being freely movable vertically on the spindle, and is held in position on said lap by the cooperating surfaces 8 and 12 which prevent the fixture from rotating in a horizontal plane.

The chuck 6, as above stated, is universally adjustable relative to the supporting member 4, and the adjustment occurs in each of three individual angularly related planes. One of the adjustments, each of which will be described independently, involves swinging movement of the tool in a substantially vertical plane about a horizontal axis; the limits of the adjustment in this plane are indicated by the intersecting dot-dash lines 13 and 14 of Fig. 2; Referring to this figure, as well as to Fig. 6, the supporting member 4 provides outwardly extending arms 15 and 16, the ends of which are formed with horizontal aligned bores 17 and 18 respectively. Said bores 17 and 18 receive, respectively, a stub shaft 20 and a headed bolt 21, the latter carrying on its outer end a wing nut 22. The inner ends of both the stub shaft 20 and bolt 21 provide bearing surfaces for an annular member 23 which supports the chuck 6. The annular member 23 is mounted for rotation about the common axis of said shaft 20 and bolt 21, and is secured to the stub shaft 20 by a set screw 24 whereby the stub shaft 20 and the annular member 23 rotate or oscillate as a unit. The head 21a of the bolt 21 engages a recess 25 in the annular member 23, whereby said annular member may be locked against rotation in adjusted position by tightening the wing nut 22. The extent of the adjustment in this plane is indicated by an arcuate plate 26 secured by a set screw 27 to the outer end of the shaft 20; the arcuate plate carries graduations or indicia 28 on its outer edge which indicate, in connection with a reference mark, not shown, on the arm 15, the position of the annular member 23 relative to the supporting member. The annular member 23 is flattened on opposite sides, as shown in Fig. 7, and the flattened portions engage the inner sides of the arms 15 and 16 adjacent the bores 17 and 18 to support said annular member against movement axially of the shaft 20 and bolt 21.

A second adjustment occurs in a substantially vertical plane, the axis of which is at right angles to the first axis adjustment and involves adjustment of the chuck 6 relative to the annular member 23, the limits of this adjustment being the dot-dash lines 29 and 30, of Fig. 1. Referring to Figs. 1 and 7, the annular member 23 has a central bore 31, the axis of which extends at right angles to and intersects the axis of the stub shaft; said bore receives a cylindrical member 32 therein, which supports said chuck 6 on a spindle 33 extending through said cylindrical member at right angles to the axis of said member 32. The cylindrical member has a forwardly extending reduced portion 34 which is screw threaded at the forward end to receive a wing nut 35 which clamps said member against rotation as will hereinafter appear. The reduced portion 34 extends through a cap 36, the latter having a cylindrical bearing surface 37 engaging with the inner bore of the annular member and an outwardly extending flange 38 engaging the forward plane surface 40 of said annular member. Said flange 38 is provided on its periphery with an indicating mark 41 which cooperates with indicia 42 on the outer surface of the annular member adjacent the forward end to indicate the extent of rotation of the cylindrical member 32 relative to the annular member, the cap 36 being rotated as a unit with said member 32 by a pin 43 which extends through the cap 36 and enters a bore in the cylindrical member 32. The cap 36 is provided with a recess 44 surrounding the reduced portion 34 of member 32, and a spring 45 in said recess, one end of said spring engaging the inner end of the recess at the other end engaging the under side of the wing nut 35, holds the flange 38 on the cap 36 in contact with the radial surface of the annular member 23 during rotation of the cylindrical member to hold the indicating marks in close relation. As best shown in Figs. 2 and 6, the annular member 23 is provided with arcuate slots 46 and 47 extending therethrough above and below the cylindrical member 32, said slots permitting the spindle 33 extending through the member 32 to oscillate as a unit with said member 32.

A third adjustment for the chuck 6 involves rotation of said chuck about the axis of the spindle 33, the latter carrying said chuck on its lower end. Referring to Figs. 2 and 6, bearing members 46a and 47a for the spindle 33, above and below the annular member 23, through which the spindle extends, have arcuately curved surfaces which engage the outer surface of the annular member, and are connected by a flat bar 48 integral with said bearing members 46a and 47a and extending substantially vertically in contact with the rearward face of the annular member. Rotation of the spindle 33 in the bearings 46a and 47a procures rotation of the chuck 6 on the end of said spindle, the angle of rotation being indicated by an indicating mark 49 on a projection 50 of the bearing 47a, and cooperating indicia 51 on a flange 52 on the spindle contacting with the under surface of the bearing 47a. The indicating marks are held in proper relation by a spring 53 surrounding the spindle 33 and received in a recess in the bearing 46a, the lower end of the spring engaging the bottom of the recess and the upper end of said spring engaging a collar 54 secured by a pin 55 to the upper end of the spindle, said spring urging the spindle upwardly to maintain said flange 52 in proper relation to the bearing 47a.

Free rotation of the spindle is prevented by the frictional contact between flange 52 and the surface of the bearing 47a, said frictional contact permitting intended rotation of said spindle for adjustment of the cutting tool. The spindle is locked against rotation by the wing nut 35 which also secures the cylindrical member 32 supporting said spindle against rotation. As the wing nut 35 is tightened, the surface of the spindle 33 is brought into engagement with the forward surfaces of the slots 46 and 47 establishing frictional contact sufficient to support said spindle against rotation on its own axis and also to prevent rotation of the cylindrical member 32. At the same time the flat bar 48 is clamped against the rearward face of the annular member 23 by tightening of the nut 35 to aid in locking the spindle against movement.

The lower end of the spindle carries the chuck 6 which may be of any usual type; in the construction shown, the lower end of the spindle 33 is screw threaded, and a knurled nut 56 engages with said screw threads to open or close jaws 57 of the chuck in response to rotation of said nut.

The cutting tool A has a plurality of angularly related surfaces which must be ground at predetermined angles to each other to provide a cutting edge which will be satisfactory. As shown in Figs. 3, 4 and 5, the cutting tool shown, which is an example of the type of tools to which the fixture is adapted, said fixture not being limited to this construction, comprises a cylindrical body portion the cutting end of which provides a surface 58 parallel to the axis of the tool, and surfaces 60 and 61 angularly related thereto, the intersections of the surfaces 60 and 61 with the surface 58 defining cutting edges of said tool. The surfaces 60 and 61 are arranged at predetermined angles $a$ and $b$ respective, relative to the axis of the cutting tool in the plane of the surface 58 and at a predetermined angle $c$ relative to the axis of the cutting tool perpendicularly to the surface 58.

In mounting the cutting tool in position for cutting, the tool is placed in the chuck and the fixture is then adjusted to bring each surface successively into contact with the grinding surface. For example, the tool is mounted in the chuck and the chuck is then rotated about the axis of the spindle 33 until the surface 58 is in precise parallel relation to the axis of the shafts 20 and bolt 21. The chuck is then rocked about the axis of the cylindrical member until the angle of the tool relative to the vertical, as indicated by the graduations 42, is the complement of the angle $a$. The chuck is then rocked about the shaft 20 and the bolt 21 until the angle of the tool A relative to the vertical, in this plane of adjustment, as indicated by the graduations 28 is the complement of the angle $c$. The fixture being clamped in this position, the tool is in position to have the surface 60 ground. The same adjustment may be made for the surface 61. It will be noted that, one surface having been established, the remaining surfaces may be readily adjusted relative thereto without removal of the tool from the fixture. The above described operation of the fixture is descriptive only and other methods for adjustment will be apparent.

Each surface, having been adjusted into a position precisely parallel to the lap or grinding surface, is ground at the desired angle, the movement of the tool against the lap being perpendicular thereto by movement of the fixture along the spindle 2. After having ground one of the desired surfaces, the others may be successively positioned and ground by adjustments of the chuck relative to the supporting member as indicated by the graduations or indicia on the fixture, all the adjustments being made without removal of the tool from the fixture.

As above stated, in resharpening dull cutting tools, the surfaces of the tool must be ground back in precise parallel relation if the proper cutting angles are to be maintained, and to accomplish this the tool to be resharpened must be located in a known position in the chuck, in order that the surfaces may be properly presented to the sharpening tool. The tool is located within the chuck by the locating fixture of Fig. 8. Referring to this figure, the locating fixture comprises a transparent plate 62 which is carried by a bearing member 63, the latter having a bore therethrough which receives the spindle 2, said plate being supported on the spindle at a right angle thereto. The plate is secured to said bearing between a flange 64 integral with the bearing and a nut 65 screw threaded onto the bearing, said nut clamping the plate against the flange.

In the use of the plate 62, the fixture 5 is inverted on the spindle 2 so that the chuck extends upwardly, Fig. 8, and the plate 62 is placed above said chuck in engagement with the tool in the chuck. The necessary and proper angular adjustments having been made in the fixture, to present a properly located tool to the sharpening surface, the tool is rotated within the chuck until a surface of the tool is flush with the plate, as indicated by any suitable manner as by a solution of Prussian blue, the position of the tool being apparent to the person adjusting the tool by inspection of said tool through the transparent plate. When the surface of the tool is located in full contact with the plate, said tool is clamped in the chuck. Inversion of the fixture on the spindle 2 will then present the tool in proper relation to the sharpening surface.

From the foregoing it will be apparent that the fixture is universally adjustable to allow a cutting tool to be positioned in a plurality of angularly related positions relative to a sharpening surface, said adjustment being effected by rotation of the cutting tool about three separate axes at right angles to each other, one axis being the axis of the spindle 33, a second axis being the axis of the annular member 23 and a third axis being the axis of the stub shaft 20 and bolt 21, and the magnitude of each adjustment being indicated by indicia on the fixture. The invention also provides a device by which the cutting tool may be located in the fixture in proper position for resharpening which involves locating the surface to be sharpened by reference to a transparent surface parallel to the sharpening surface.

I claim,

1. A device for supporting a cutting tool having a plurality of angularly related surfaces to be ground, in contact with a sharpening surface during the sharpening of said tool, said device comprising a support mounted for free sliding movement on a shaft, means attached to said support and universally adjustable relative to said support for supporting said cutting tool, and a transparent surface in parallel relation to the sharpening surface to indicate the proper position of the cutting tool.

2. A device for supporting a cutting tool, having a plurality of angularly related surfaces to be ground, in contact with a sharpening surface during the sharpening of said tool, said device comprising a support mounted for free sliding movements on a shaft and reversible thereon, means attached to said support and universally adjusted relative to said support for supporting said cutting tool and a transparent member arranged to be mounted on said shaft in parallel relation to the sharpening surface to indicate the proper position of the cutting tool.

3. In the method of locating the surface of a cutting tool in position for a sharpening operation, the step which comprises bringing one of the tool surfaces into contact with a transparent plate parallel to the sharpening surface.

4. In the method of locating the surface of a cutting tool in position for a sharpening operation, the steps which comprise mounting said tool adjustably on a rectilinearly slidable member, bringing one of the tool surfaces into contact with a transparent plate parallel to the sharpening surface by adjustment of said tool relative to the slidable member and then moving said member to bring the tool surface into contact with the sharpening surface.

5. In the method of locating the surface of a cutting tool in position for a sharpening operation, said tool being mounted in a supporting structure, the step which comprises bringing one of the tool surfaces into contact with a transparent plate, the latter being in the same position relative to the tool supporting structure as the position of the sharpening surface relative to the supporting structure during the sharpening operation.

6. A device for supporting a cutting tool having a plurality of angularly related surfaces to be ground in contact with a sharpening surface during the sharpening of said tool, said device comprising a tool supporting structure in which said tool is universally adjustable and a transparent surface arranged to be mounted in the same position relative to the tool supporting structure as the position of the sharpening surface relative to said supporting structure during the sharpening operation.

7. A device for supporting a cutting tool having a plurality of angularly related surfaces to be ground in contact with a sharpening surface during the sharpening of said tool, said device comprising a support mounted for free sliding movement on a shaft, means attached to said support and universally adjustable relative to said support for supporting said cutting tool, and a transparent member arranged to be mounted on said shaft in parallel relation to the sharpening surface to indicate the proper position of the cutting tool.

8. A device for supporting a cutting tool having a plurality of angularly related surfaces to be ground in contact with a sharpening surface during the sharpening of said tool, said device comprising a shaft, means for supporting said shaft in predetermined relation to a sharpening surface, a tool supporting structure in which said cutting tool is universally adjustable, said structure being mounted on said shaft, and a transparent member arranged to be mounted on said shaft in the same position relative to the tool supporting structure as the position of the sharpening surface relation to said structure during the sharpening of said tool.

9. A device for supporting a cutting tool during the sharpening thereof, said tool having a plurality of angularly related surfaces, said device comprising a shaft, means for supporting said shaft in predetermined relation to a sharpening member, a tool supporting structure mounted for free sliding movement on said shaft, a spindle having means for clamping a tool, and means for mounting said spindle in said supporting structure, said spindle being turnable about its longitudinal axis relative to said supporting structure with means for indicating the extent of the turning movement, said mounting means also providing for angular adjustment of said spindle about intersecting axes substantially perpendicular to, and intersecting the axis of, said spindle, with means for clamping said spindle in angularly adjusted position, to provide for universal adjustment of said clamping means relative to the supporting structure.

WILLIAM D. SCHMIDT.